United States Patent [19]

Hammond

[11] Patent Number: 4,796,026

[45] Date of Patent: Jan. 3, 1989

[54] NOISE TOOL AND METHOD

[75] Inventor: John A. Hammond, Houston, Tex.

[73] Assignee: Western Atlas International, Inc., Houston, Tex.

[21] Appl. No.: 75,280

[22] Filed: Jul. 20, 1987

Related U.S. Application Data

[63] Continuation of Ser. No. 349,265, Feb. 16, 1982, abandoned.

[51] Int. Cl.$^4$ .............................................. G01V 1/40
[52] U.S. Cl. ...................................... 340/857; 367/86
[58] Field of Search ....................... 367/86, 25; 375/5; 340/857

[56] References Cited

U.S. PATENT DOCUMENTS

| | | | |
|---|---|---|---|
| 2,802,951 | 8/1957 | Seevers | 340/861 |
| 3,192,386 | 6/1965 | Hopkinson | 340/861 |
| 3,263,159 | 7/1966 | Albright | 340/857 |
| 3,942,110 | 3/1976 | Milkovic | 324/142 |
| 4,302,757 | 11/1981 | Still | 340/857 |
| 4,353,122 | 10/1982 | Cubberly, Jr. | 367/25 |
| 4,355,310 | 10/1982 | Belaiques et al. | 340/861 |
| 4,355,401 | 10/1982 | Ikoma et al. | 375/5 |

Primary Examiner—Thomas H. Tarcza
Assistant Examiner—Ian J. Lobo
Attorney, Agent, or Firm—Browning, Bushman, Zamecki & Anderson

[57] ABSTRACT

Apparatus for detecting acoustic disturbances include an electrical circuit for processing electrical signals generated by an acoustic sensor in response to acoustic disturbances. The processing circuitry converts the electrical data signals into output signals wherein the information about the input audio signals is carried by the frequencies of the output signals. High frequency signals may be isolated and processed to provide relatively low frequency digital pulse signals which may be readily transmitted over wirelines in a logging operation. The sensor apparatus may include a stack of piezoelectric crystals which are electrically connected by means of pressure contacts.

35 Claims, 3 Drawing Sheets

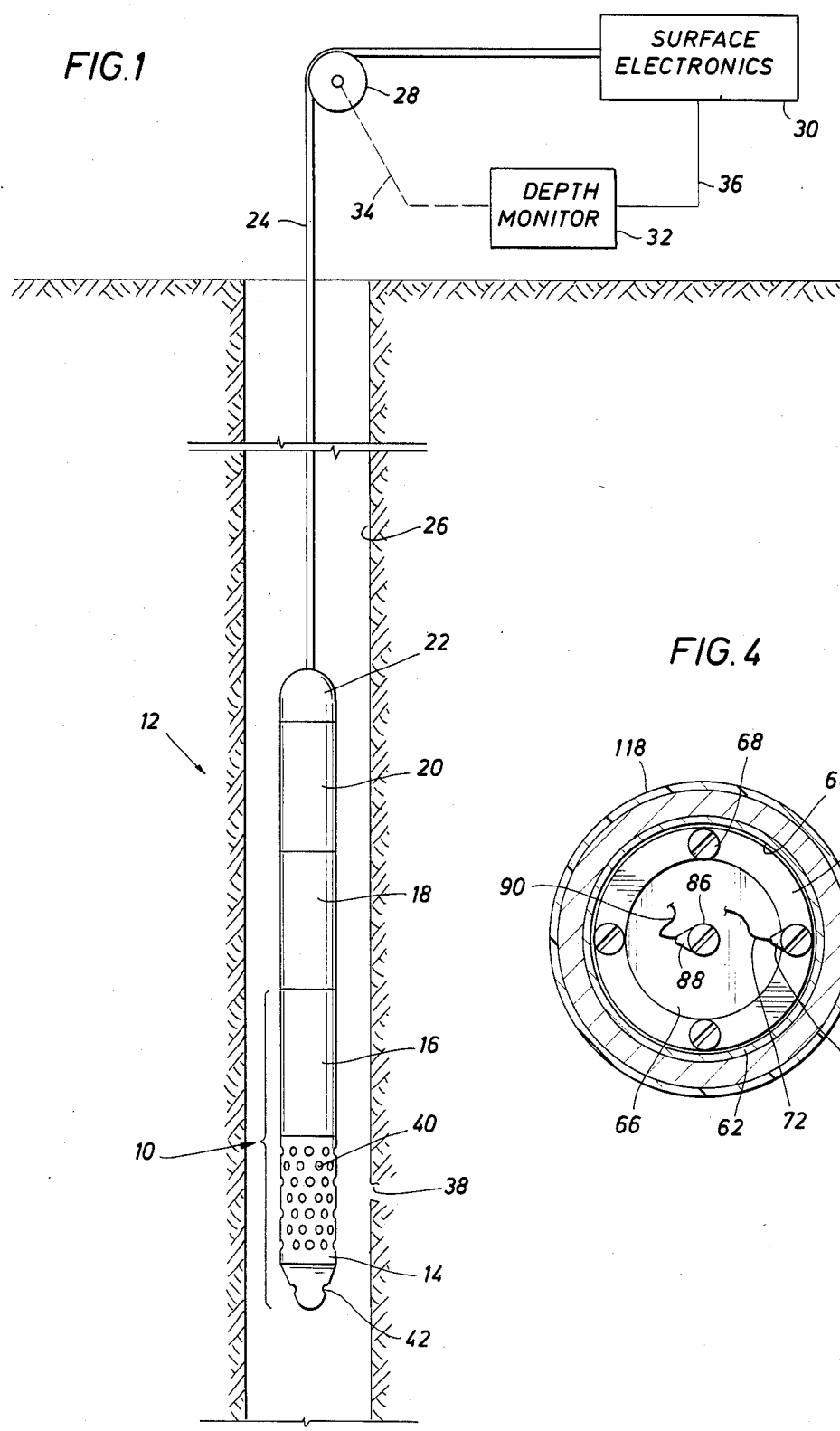

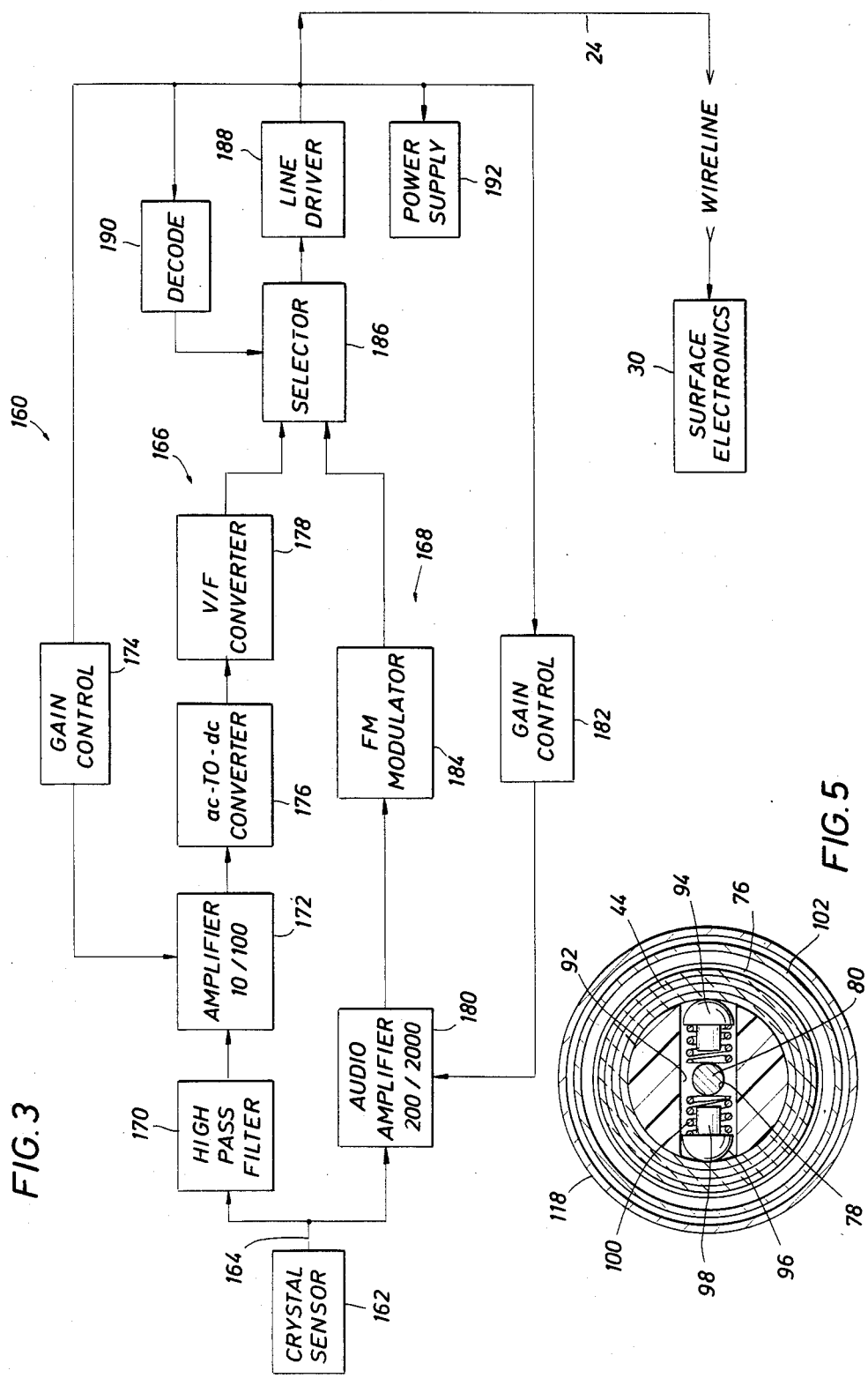

NOISE TOOL AND METHOD

This is a continuation of co-pending Application Ser. No. 349,265 filed on Feb. 16, 1982, now abandoned.

BACKGROUND OF THE INVENTION

1. Field of the Invention

The present invention pertains to techniques for detecting acoustic disturbances. More particularly, the present invention is related to methods and apparatus for detecting noises, and for processing electrical signals produced by noise detectors to convey information about the detected noise. The present invention finds particular application in the field of well logging.

2. Description of Prior Art

Various techniques are known for logging wells wherein one or more logging tools, designed to detect or measure various characteristics of underground formations or of fluid in the well, are positioned in the well at various depths where such information is to be gathered. Typically, a logging run of a well is carried out by lowering a logging tool within a well to at least the greatest depth at which information is to be gathered, and then raising the tool throughout the region under investigation while the tool is operated to sense the particular characteristics to be observed. Such maneuvering of the tool is generally done with the tool suspended and operated by means of a wireline, which may also include one or more electrical conductors by which operating instructions may be conveyed from the surface to the tool, and by which data signals may be transmitted from the tool to the surface for processing.

One technique for logging wells employs the use of a noise tool whereby downhole sounds may be detected and, at the surface, analyzed electronically to determine, for example, the locations of fluid leaks into or out of the well borehole. Noise tool logging may be carried out generally in uncased as well as cased wells. The movement of fluid between a formation and the borehole by way of a fissure or other aperture in the formation face at the well is generally accompanied by noise including high frequency sounds. Similarly, gas rushing through a puncture or perforation in a casing will generate a noise spectrum including high frequencies. Movement of liquids in similar fashions may be accompanied by noise, including possibly high frequency sounds. The movement of fluid behind a casing and from one formation to another will also generate noise. However, prior noise tools have been limited in their usage for several reasons. Movement of a logging sonde within a well generates considerable noise, particularly in the audio frequencies, which tends to drown out the noise generated by fluid movements that are to be detected. Consequently, prior noise tools have generally been used by positioning and holding the tool at a specified location, with all other operations stopped, to carry out the noise-measuring process. The tool is then moved to another location for further data gathering, if necessary, with no data being acquired during the movement. All measurement are thus made with the tool in a stationary configuration.

Further, data from prior noise tools have typically been analyzed in extended frequency ranges. For example, with the acoustic disturbance sensor in the noise tool being a stack of piezoelectric crystals, the electronic signals produced by the sensor are processed through a collection of high pass filters to yield a like number of broad frequency spectrum signals whose amplitude versus depth values are compared in the quest for locating leaks, for example. Consequently, the data has been used in analog form. Since the electronic signals from the sensor must be carried to the surface for analysis by means of a wireline, large signal attenuation is experienced in the analog, amplitude modulated signals, particularly in the case of high frequency signals. The problem becomes acute, especially in the high frequency ranges, for deep wells so that, at the surface, the high frequency signals are essentially lost. It is desirable to provide a technique for logging a well by detecting the presence of high frequency sounds, wherein the high frequency sounds may be sensed with sufficient sensitivity, and the corresponding information signals transmitted to the surface without undue attenuation, and wherein the noise measurements could be made while the logging tool is being moved along the well bore.

Piezoelectric sensors in prior noise tools generally include a plurality of crystals that are tubular in form. The crystals are arranged in a longitudinal stack around a central core. The radially inward and outward surfaces of the crystals may be plated with silver for purposes of electrical contact with conductors which carry the electrical signals generated by the piezoelectric stack in response to acoustic disturbances incident on the stack. The inner surfaces of all of the crystals are electrically connected together by means of springs positioned within the core and held under compression between the radially inward surfaces of the crystals and a central conducting rod contained within the core, which is otherwise constructed of insulating material. The radially outward surfaces of the crystals are connected together by means of a braided wire which is soldered to the silver plating on the crystal surfaces. The crystals are longitudinally mutually separated by O-rings acting as spacers and insulators. The braided wire passes over the O-rings. In this way, the crystals in the stack are all connected in parallel, so that the electrical signals generated by the stack of crystals is the average of the electrical signals produced by all of the individual crystals acting alone in response to the same acoustic disturbances.

The piezoelectric stack is enclosed within a cylindrical diaphragm which is generally a thin-walled stainless steel tube. The tube is filled with oil and, when acoustic disturbances are incident on the diaphragm, the disturbances are transmitted through the thin wall of the diaphragm and the oil to the crystals. However, the braided wire may contact the vibrating diaphragm in the vicinity of an O-ring where the braided wire is positioned particularly close to the diaphragm. Such contact with the diaphragm provides a ground path for the conductor, and generates large amounts of electronic noise which interferes with the signal. Further, it may be difficult to solder the braided wire to the silver plate, with the plate at that point possibly detaching from the crystal surface. Finally, with the crystals thus joined together by means of the braided wire to which the crystals are soldered, if one crystal becomes defective, the stack of crystals must be replaced. The spring contacts against the radially inward surfaces of the crystals may also scratch the silver plate on those surfaces, possibly causing the quality of the electrical contact at those points to deteriorate.

It is desirable to provide a noise logging tool with a sound sensing device including electrical conductors which are efficient and relatively easy to install and maintain, which provide good electrical connections with the crystals, and which do not cause any deterioration of the quality of those electrical contacts.

SUMMARY OF THE INVENTION

The present invention provides apparatus for detecting acoustic disturbances, including sensor apparatus for providing electrical signals responsive to acoustic disturbances, and apparatus for processing such electrical signals, the processing apparatus including electrical circuitry to provide output signals for transmission wherein the frequency of such output signals carries information concerning the amplitude of the electrical signals provided by the sensor apparatus. In one form of the electrical circuitry, the electrical signals from the sensor apparatus are processed to provide output signals in the form of dc pulses wherein the pulse rate is representative of the amplitude of the electrical signals from the sensor apparatus. In another form of the electrical circuitry, output signals are provided in the form of analog frequency modulated signals whose frequency is representative of the amplitude of the electrical signals from the sensor apparatus. Such signals may be transmitted by wireline with little or not signal attenuation. The present invention finds particular application to well logging tools, wherein both forms of the electrical circuitry may be provided, and selector apparatus may also be included whereby the operator of the logging system may selectively choose which form of the electrical circuitry to employ in processing electrical signals from the sensor apparatus.

In the form of the electrical circuitry wherein dc pulse signal are provided, the input signals from the sensor apparatus may be converted from ac to dc, with the result of such conversion being dc voltage levels indicative of the amplitude of the input amplitude modulated signals. The dc voltage levels may then be converted to dc pulse signals, with the pulse rate representative of the input dc voltage levels, so that the rate of pulsing of the output signals is representative of the amplitudes of the input signals from the sensor apparatus. The pulse rates, however, may be significantly lower than the frequencies of sound detected by the sensor apparatus. Additionally, the data signals from the sensor apparatus may first be limited by a high pass filter to transmit only signals above a cutoff frequency. In this way, the circuitry may be employed to select high frequency signals for processing to the exclusion of lower frequency, and perhaps greater amplitude, signals. Thus, activities in logging, for example, which are accompanied by high frequency sounds, such as the flow of fluid through an orifice indicating a leak, may be particularly detectable with the present invention.

The sensor apparatus may include one or more piezoelectric crystals. With a stack of crystals, the electrical contact surfaces of the crystals may be mutually joined so that the crystals are electrically connected in parallel, making the output signal from the stack of crystals to be the average signal generated by the crystals in the stack. Electrical contacts with the crystal surfaces may be made for the purposes of communicating electrical signals to the processing circuitry by means of first and second contact apparatus, each of which include resilient members for maintaining electrical contact with the crystals under pressure. For example, where the piezoelectric crystals are generally tubular in form, they may be arranged to circumscribe a central core which includes a first electrical conductor in the form of a pole positioned within the otherwise insulating core. Electrical contacts may be positioned within the core and biased radially outwardly between the pole and the interior surfaces of the crystals acting as electrical contact surfaces. A second electrical connector may be provided in the form of an elongate, continuous electrical conductor shaped generally in a helix circumscribing the piezoelectric crystals., and maintained in electrical contact with the outer surfaces of the crystals by the resiliency of the helical conductor acting as a spring.

In a method of this invention, a well is logged with a logging tool including a detector for sensing acoustic disturbances and generating electrical signals in response thereto. The electrical signals are converted into output signals whose frequency is representative of the amplitude of the input electrical signals produced by the detector, the output signals are transmitted to the surface.

The present invention thus provides a technique for detecting acoustic disturbances wherein high frequency sounds may be detected and converted, for example, to electrical signals of relatively low frequency which may then be transmitted over a long wireline if necessary. Additionally, the acoustic disturbance sensor apparatus includes, for example, a stack of piezoelectric crystals which are electrically mutually connected in such a manner that the crystal stack may be readily disassembled and individual crystals replaced if necessary. Further, the pressure contacts of the electrical connections with the crystal stack are such as to leave the crystal contact surfaces undamaged and without change in the electrical conduction characteristics of these surfaces.

BRIEF DESCRIPTION OF THE DRAWINGS

FIG. 1 is a schematic view, in side elevation and partial section, of a logging sonde, including a noise tool, positioned within a well and suspended by a wireline from surface apparatus;

FIG. 3 is a block diagram of the sound sensor and downhole signal processing circuitry of a noise logging tool;

FIG. 4 is an enlarged transverse cross section of the nose logging tool taken along line 4—4 of FIG. 2A; and FIG. 5 is an enlarged transverse cross section of the noise logging tool taken along line 5—5 of FIG. 2A.

DESCRIPTION OF PREFERRED EMBODIMENTS

Figure 2A:
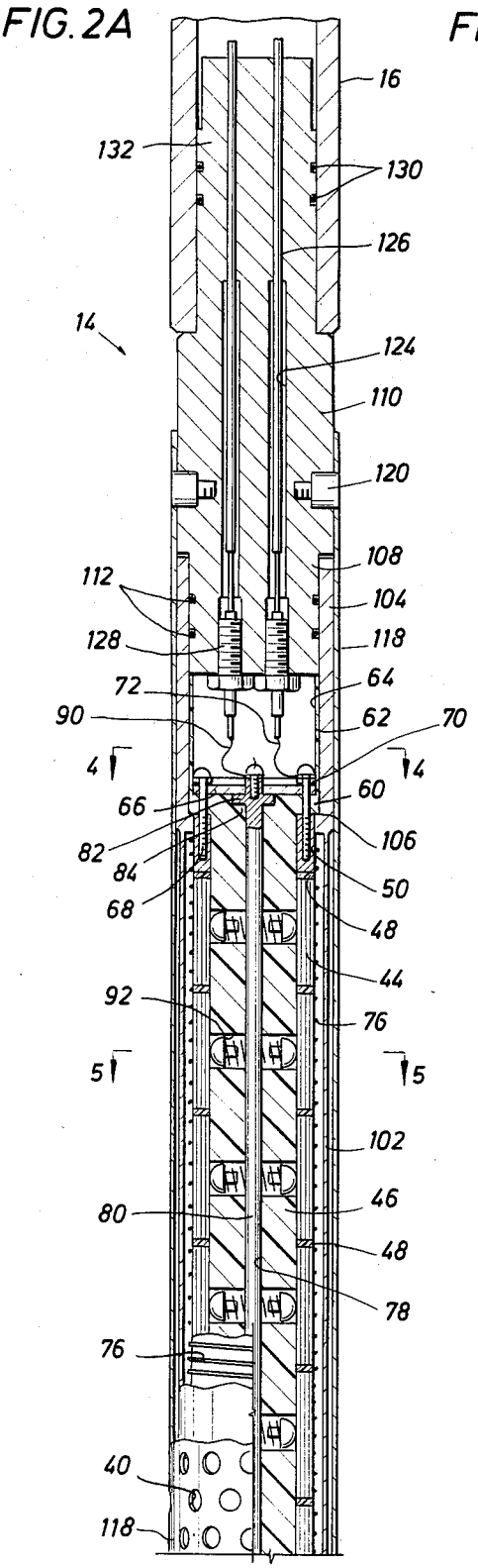
FIGS. 2A and 2B together provide a side elevation in partial section of the sound sensor apparatus of a noise logging tool, FIG. 2A including the upper portion of the apparatus and FIG. 2B showing the lower portion.

Apparatus for detecting acoustic disturbances according to the present invention is shown generally at 10 in FIG. 1 in the form of a well logging tool which is included within a logging sonde shown generally at 12. The acoustic disturbance, or noise, detecting apparatus 10 includes a noise sensor section 14 and a signal processing section 16. As is well known in the art, additional logging tools 18 and 20 may, for example, be included within the logging sonde 12, though details of such tools are not part of the present invention. Finally, a wireline connector section 22 may be provided whereby the sonde 12 is suspended by a wireline 24 which may be in the form of an armoured cable including one or more electrical conductors for transmitting electrical signals between the sonde 12 and associated apparatus at the well surface. Appropriate electrical and mechanical connections may thus be provided in the connector section 22 to appropriately support and connect the sonde 12 by means of the wireline 24.

The logging sonde 12 is shown in FIG. 1 positioned downhole within a well bore 26. The well bore 26 may be cased in the usual manner, but need not be since the present invention may be utilized with either cased or uncased wells. At the surface of the well, the wireline 24 is shown passing over a sheave 28 and being connected to surface electronics 30. Such surface electronics may include signal analyzing and/or recording equipment, for example. A depth monitor 32 is indicated at 34 as connected to the sheave 28. The depth of the sonde 12 may be monitored by use of the rotating sheave 28, for example, which triggers the depth monitor 28 to generate depth-indicating signals fed by line 36 to the surface electronics 30 whereby the data analysis achieved with the surface electronics may be presented as a function of the various depths at which the analyzed data was obtained.

The sonde 12 is shown positioned with the acoustic sensor section 14 in the vicinity of an opening 38 in the surrounding wall of the well. The opening 38 might be a perforation or leak hole in the casing lining the well, or, if the well is uncased, may be a fissure or other orifice in the face of a surrounding formation intersecting the well bore 26.

The sensor section 14 features a plurality of holes 40 in the housing of the section through which acoustic disturbances, which might be generated by fluid flowing into or out of the well bore 26 by means of the opening 38, may be communicated to a pressure-sensitive diaphragm included in the sensor apparatus, as described in detail hereinafter. The base of the sensor section 14 includes holes 42 by which ambient fluid pressure in the well at the location of the sonde 12 is communicated to a flexible member for purposes of equalizing the pressure differential across the pressure-sensitive member in the absence of acoustic disturbances incident thereon, as more fully discussed hereinafter also.

It will be appreciated that the well bore 26 may be filled with liquid at the location of the sonde 12, in which case it may be expected that gases moving through the opening 38 would generate sounds, particularly in the higher frequency ranges. Such high frequency sounds, or sounds similar thereto, would also be expected if the well were "dry," that is, relatively free of liquid at the level of the sonde 12, with the gases flowing through the hole 38 meeting relatively little resistance. Liquids flowing into or out of the hole 38 would also generate sounds, including possibly some high frequency sounds. However, the sounds generated by passage of liquid through the opening 38 if the well is filled with liquid at the level of the sonde 12 may be expected to be relatively muted. However, a noise logging tool would nevertheless be capable of detecting what sounds the liquid flow would generate. Further, with the present invention, the high frequency sounds such liquid flow might generate might be isolated and separately processed and analyzed.

Details of the apparatus within the sensor section 14 may be appreciated by reference to FIGS. 2A, 2B, 4 and 5. The sensor section, shown generally at 14 in FIGS. 2A and 2B, includes a stack of a plurality of piezoelectric crystals 44, with six such crystals included in the apparatus as illustrated herein. The crystals 44 are generally tubular in shape, and are mounted about a core 46 of insulating material. The crystals 44 are mutually isolated and electrically insulated by ring spacers 48 of electrically insulating material, and which are also positioned about the core 46. Spacers 48 may also be provided to isolate and insulate the crystals 44 from the end constructions, such as the electrically conducting collar 50 which encircles the core 46 at its top end, and the coil spring 52 which encircles the core at its lower end. Spring retainers 54 and 56 abut opposite ends of the coil spring 52, with the lower retainer 56 limited in its downward movement by a snap ring 58 positioned in an appropriate groove in the core 46, and the upper retaining ring 54 pressed by the spring 52 against the spacer 48 adjacent the bottom crystal 44. Since the conducting collar 50 is limited against further upward movement by an annular shoulder 60 of the core 46, the compressed spring 52 maintains the stack of crystals 44 under longitudinally-directed pressure.

The top of the core 46 continues in a generally cylindrical extension 62 which defines a generally cylindrical chamber 64. Within the chamber 64, a wafer 66 of electrically insulating material 66 is held in place across the core 46 at the base of the chamber 64 by bolts 68 of electrically conducting material. The bolts 68 pass through a ring of electrically conducting material 70, through appropriate holes in the wafer 66 and the core 46 and into the conducting collar 50. Thus, the heads of the bolts 68 are electrically connected to the collar 50. An electrical lead line 72 is electrically connected to one of the bolts 68 by means of a terminal 74 (FIG. 4).

A silver plated coil spring 76 is positioned about the cylindrical surface defined by the radially outward surfaces of the crystals 44, the spacers 48 and the collar 50, down to the vicinity of the spring retainer 54. Each of the crystals 44 has its outer surface coated, or plated, with silver as well so that, with the coil spring 76 under even mild tension, the electrical contact between the spring and the outer surface of each of the crystals 44 and that of the collar 50 is assured by the tendency of the spring to tighten about the cylindrical assembly. Thus, all of the crystals 44 are electrically connected to the lead line 72 by way of the spring 76, the collar 50, the bolts 68 and the terminal 74. While any type of elongate, continuous electrically conducting material may be wrapped about the stack of crystals 44 and the collar 50 to provide the necessary electrical connection, a helical spring as described provides a relatively efficient and convenient conductor for mounting and operating purposes.

An elongate, longitudinally-oriented passageway 78 extends the length of the core 46 and is centered therein. An elongate, rigid electrical conductor in the form of a rod, or pole, 80 extends downwardly within the passageway 78 beyond the vicinity of the lowest crystal 44 in the stack, and is fixed towards the top of the core 46 by a radially-outwardly extending annular flange 82 of the pole resting on a radially-inwardly extending annular should 84 of the core. The pole 80 extends upwardly above the flange 82 through an appropriate bore in the wafer 66, and receives a bolt 85 to which is attached, by a suitable terminal 88, an electrical lead line 90.

The core 46 includes a plurality of laterally-extending cross bores 92, there being one cross bore for each crystal 44, and each bore being longitudinally positioned to lie at least partially within the longitudinal limits of a different crystal. Within each bore 92 there is located a pair of electrically conducting caps 94. Each cap 94 features a rounded head 96 mounted on an elongate, generally cylindrical shaft 98. The shaft 98 is circumscribed in each case by a separate coil spring 100 under compression between the base of the rounded head 96 of the corresponding cap 94 and the surface of the elongate pole 80. Thus, each spring 100 biases the corresponding cap 94 radially outwardly into pressure contact with the radially interior surface of the surrounding tubular crystal 44. Providing the biased caps 94 in pairs of like caps and springs 100, with each cap positioned oppositely to its mate balances the resulting lateral forces on the pole 80 and on the crystals 44. The interior surface of each crystal may be silver plated to enhance electrical contact between the crystal and the pair of caps 94, which may also be silver plated. The electrical connection is further communicated between the caps 94 and springs 100 to the pole 80 and to the electrical lead line 90. The pressure produced by the springs 100, and the rounded surfaces of the heads 96, insuring smooth and relatively soft contact between the caps 94 and the crystal surfaces provide good electrical contact without any damage done to the crystals 44 as a by-product.

It will be appreciated that the electrical connections thus described between the crystals 44 and the caps 94, and between the crystals and the spring 76, are pressure contacts which require no soldering or other permanent connections between the crystals and other elements, and which are insured by the resilient members, that is, springs 100 and spring 76 included within the interior and exterior contact assemblies, respectively. Further, if the need arises, the crystal stack 44 may be disassembled and one or more crystals replaced, with no damage or permanent alterations done to any of the crystal surfaces.

The piezoelectric stack of crystals 44 is generally circumscribed by an elongate, cylindrical diaphragm 102 in the form of a thin-walled stainless steel tube. The thickness of the wall of the diaphragm 102 increases at the top end of the diaphragm to provide a mounting collar 104 which is limited in its upward positioning relative to the core 46 by the butting of annular shoulders at 106. The collar 105 receives the bottom shank 108 of a connector member 110. Two O-ring seals 112 carried in appropriate annular grooves in the shank 108 seal the collar 104 to the connector 110.

At its lower end, the thin-walled diaphragm 102 fits snugly about the top shank 113 of a bottom plug 114, and is welded thereto at a shoulder of the plug at 116. The welded joint at 116 mechanically fixes the diaphragm 102 to the bottom plug 114, and also fluid-seals the diaphragm to the bottom plug.

The diaphragm 102 is circumscribed by an elongate, generally cylindrical sleeve, or housing, 118 which receives the connector member 110 and is affixed thereto by multiple bolts 120 set in appropriate bores in the sleeve and the member 110. The sleeve 118 also receives, at its lower end, the bottom plug 114 and is affixed thereto by multiple bolts 122 set in appropriate bores in the plug and the sleeve. The fixing of the sleeve 118 relative to the connector member 110 and the bottom plug 114 by means of the bolts 120 and 122, respectively, effectively locks the diaphragm 102 and the core 46 in place relative to the top and bottom elements 110 and 114, respectively. Thus, the diaphragm 102 cooperates with the connector member 110 and the bottom plug 114 to define, in part, a fluid-tight chamber therewithin, about which is situated the protective sleeve 118. The holes 40 noted in the above discussion of FIG. 1 pass through the sleeve 118 in the vicinity of the crystals 44 whereby acoustic disturbances may be communicated through the sleeve holes and to the diaphragm 102. Otherwise, the sleeve 118 provides a protective housing to prevent undesirable contact of the thin-wall diaphragm 102 with objects in the environment which might otherwise damage the diaphragm.

Figure 2B:
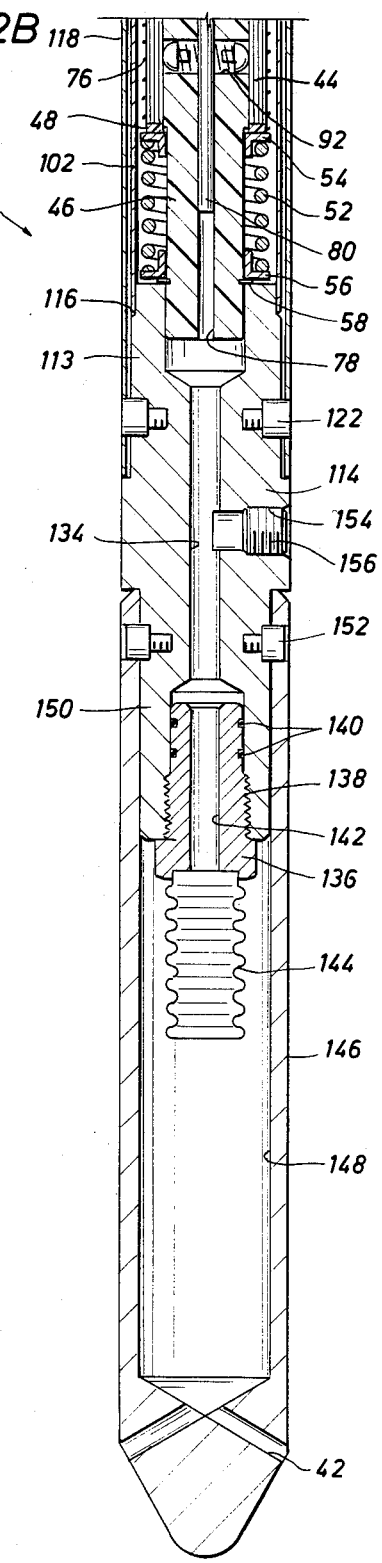

It may be appreciated by reference to FIGS. 2A, 2B and 5 that there exists a generally annular and elongate space between the internal surface of the sleeve 118 and the external surface of the diaphragm 102 in the vicinity of the crystals 44. There is also provided a generally annular and elongate space between the interior surface of the diaphragm 102 and the exterior surfaces of the crystals 44, the spacers 48, the collar 50 and the spring contact 76. Thus, the diaphragm 102 is relatively free to vibrate in response to acoustic disturbances incident thereon without danger of physical and, therefore, electrical contact between the spring conductor 76 and the diaphragm 102.

The connector member 110 features a pair of elongate passageways 124 of varying transverse cross section of accommodate a pair of insulate electrical lead lines 126 which terminate at the bottom of the connector 110 in fluid-tight seal fittings 128. The electrical lead lines 72 and 90 are connected to the seal connectors 128 so that the lead lines 126 are electrically conducting extension of the lead lines 72 and 90, respectively, for communicating with signal processing circuitry in the next section 16 containing processing equipment. The top of the connecting member 110 is fluid-tight sealed to the signal processing section 16 by a pair of O-ring seals 130 residing in appropriate annular grooves within the outer surface face of an upper shank 132 of the top connecting member, received within the bottom end of the signal processing section 16.

The top shank 113 of the bottom plug 114 extends to the vicinity of the snap ring 58. An elongate internal passage 134 extends the length of the bottom plug 114 and is of varying transverse cross section, as shown in FIG. 2B. The passage 134 receives, at its top end, the bottom of the core 46, and is in communication with the internal passage 78 of the core.

At its lower end the passage 134 receives a bellows mounting 136 which is fixed relative to the bottom plugs 114 by threaded connection at 138 within the passageway 134. The bellows mounting 136 is sealed to the interior wall of the passage 134 by a pair of O-ring seals 140 mounted in appropriate annular grooves in the bellows mounting. A longitudinally-extending internal passage 142 within the bellows mounting 136 communicates with the passage 134 of the bottom plug 114 and the interior of a bellows 144, which is mechanically and sealingly fixed to the bellows mount, in any appropriate manner, such as by a metal-to-metal seal, about the bottom end of the internal passage 142.

It will be appreciated that there exists a fluid-tight chamber within the sensor apparatus section 14, which chamber is, at least in part, defined by the O-ring seals 112 carried by the top connector member 110 and the sealing connectors 128, the interior surface of the diaphragm 102, the walls of the internal bottom plug passage 134, the O-ring seals 140 carried by the bellows mount 136, the interior surface of the passage 142 through the bellows mount 136, and the interior surfaces of the bellows 144. The various elements included within and on the core 46 are within the above-defined fluid-tight chamber. This entire fluid-tight chamber may be flooded with liquid, such as oil, for the purpose of transmitting acoustic disturbances from the diaphragm 102 to the crystals 44. At the same time, if the volume of the given amount of oil or other liquid within the this fluid-tight chamber is made to vary, either by a change in temperature and/or a change in ambient pressure, the bellows 144 may contract or expand accordingly to accommodate the volumetric change of the liquid.

An elongate foot 146 includes an internal chamber 148, which receives the bellows 144, bellows mounted 136 and a bottom shank 150 of the bottom plug 114. The foot 146 is fixed relative to the bottom plug 114 by means of a multiplicity of bolts 152 set in appropriate bores in the bottom plug and the foot. The bottom of the foot 146 includes the bores 42 which communicate between the internal chamber 148 and the environment. Thus, the exterior of the bellows 144 is exposed to ambient fluid pressure, through the bores 42 and the chamber 148, while being protected against possible harmful contact with objects in the environment by the walls of the foot 146.

It will be appreciated that the diaphragm 102 may be subjected to a zero pressure differential between the fluid-tight internal chamber partly within the diaphragm as described hereinbefore and the environment, which acts on the diaphragm through the holes 40 in the sleeve 118, through the use of the bellows 144 which may expand or contract to accommodate expansion and/or contraction of the fluid within the internal (diaphragm) fluid-tight chamber. Thus, for example, at the surface, the internal chamber may be filled with oil poured through a bore 154 in the side of the bottom plug 114 and communicating with the central passage 134 thereof, and the bore 154 closed with a fluid-tight threaded plug 156 with the bellows 144 in a relaxed, or intermediate, configuration. Then, the fluid pressure within the internal chamber of the sensory apparatus 14 would be at or near atmospheric pressure. As the sensor apparatus 14 is lowered in a well, the temperature surrounding the apparatus may be expected to rise, tending to cause expansion of the fluid within the apparatus. As such occurs, the bellows 144 would be free to yield and expand, allowing the internal fluid to expand against the surrounding fluid, whether it be liquid or gaseous. On the other hand, if the sensor apparatus section 14 is submerged under well fluid at a point with a significant static pressure head, for example, the fluid within the internal chamber of the sensory apparatus might tend to be compressed, due primarily to action of the ambient fluid on the bellows 144 driving this element toward a collapsed or partially collapsed configuration. In any event, the bellows 144 would respond to any tendency of the internal fluid within the apparatus 14 to expand or contract relative to the ambient fluid and/or in response to the ambient temperature so that, ultimately, the pressure differential across the bellows and the diaphragm 102 would become zero. In such circumstances then, the diaphragm 102 would be free to transmit acoustic disturbances from the surrounding fluids to the fluid within the internal (diaphragm) chamber of the sensory apparatus 14 and, then, to the stack of piezoelectric crystals 44.

As is well known in the art, piezoelectric crystals subject to acoustic disturbances generate electrical signals across the crystals in response to the acoustic disturbances, wherein the signals reflect characteristics of the acoustic disturbances. Thus, the intensity, frequency and structure of the acoustic disturbances are all reflected by the corresponding characteristics, including amplitude, frequency and structure, of the resulting electrical signals. In the present invention, such electrical signals are generated across the radial extent of each crystal subject to the acoustic disturbances, so that the resulting electrical signals are transmitted by way of the spring contact 76 and the contact assembly including the caps 94 and the central pole conductor 80 to the lead lines 72 and 90, respectively, and thence by the conducting leads 126 to the electrical processing section 16.

The construction and operation of the electrical processing section apparatus may be appreciated by reference to FIG. 3, wherein the electrical processing circuitry is shown generally at 160. A crystal sensor 162 provides electrical signals representative of acoustic disturbances incident thereon, with the electrical data signals transmitted by way of an electrical conducting system 164 to the circuitry shown generally at 160. The crystal sensor 162 may, for example, include the stack of piezoelectric crystals 44 described and illustrated hereinbefore, and the electrical conducting system 164 may include the spring 76 and cap and pole contacts 94 and 80, respectively, with the various lead lines noted hereinbefore. before. The piezoelectric crystals 44 are connected electrically in parallel as described so that the output signals carried by the conductor leads 72 and 90 are averages of the output signals generated by the individual crystals, thus eliminating the effects of discrepancies among the crystals, if any. Either of two circuit branches 166 and 168 of the circuit 160 may be utilized to convert the electronic signals produced by the crystals sensor 162, which signals are alternating and analog in form, and amplitude modulated so that their amplitude is representative of the acoustic disturbances experienced by the crystal sensor, to output signals whose frequencies are representative of the amplitudes of the signals from the crystal sensor.

The first circuit branch 166 separates electronic data signals from the crystal sensor 162 corresponding to low frequency acoustic disturbances from signals corresponding to high frequency disturbances, and processes the latter to produce digital pulse output signals whose frequency, or pulse rate, is representative of the amplitude of the high frequency data signals selected from the crystal sensor. High-pass filter circuitry 170, with a gain of 100, receives the electronic data signals from the crystal sensor 162 by way of the conducting system 164, and passes frequencies above a cutoff frequency. A cutoff frequency of 15 kHz is preferred for this purpose. The high frequency electronic data signals are amplified by a factor of 10 or 100, for example, by means of one or more amplifier circuits 172. The amplification factor may be selected by the operator at the surface, for example, by means of a gain control 174 operable by an instructional signal sent from the surface electronics 30 down the wireline 24 to the gain control. Such a change in amplification factor might be effected, for example, upon the operator observing the output signals received at the surface electronics 30.

The amplified high frequency electronic data signals are then converted from ac, or analog, form to dc voltage levels by an ac-to-dc converter 176. The dc voltage levels included in the output signals of the converter 176 are representative of the amplitudes of the electronic data signals produced by the crystal sensor 162. These dc voltage levels are then converted to digital pulse train signals by a V/F converter 178. the converter 178 provides output signals whose frequencies are directly related to the dc voltage levels provided by the converter 176. Consequently, the pulse rates or frequencies of the output signals from the converter 178 may, in general, be considerably lower than the frequencies of the acoustic disturbances incident on the crystal sensor 162, and the signal frequencies passed by the filter 170. The frequencies of sounds which may be thus detected by the crystal sensor 162, with the electronic data signals produced by the crystal sensor converted into pulse rate signals as output from the converter 178, may extend considerably into the ultrasonic audio range. Thus, the first circuit branch 166 not only provides a form of frequency-modulated output signals corresponding to, and carrying information about the characteristics of, the audio signals incident on the crystal sensor 162, but the output electronic signals are reduced in frequency. Therefore, these pulse output signals may be readily transmitted along an extensive wireline 24 without significant signal attenuation which normally accompanies the transmission of high frequency electronic signals and amplitude modulated signals over long lines.

The second circuit branch 168 converts the data electronic signals from the crystal sensor 162 into output signals which are frequency modulated, but still analog in form. Electronic data signals from the crystal sensor 162 are amplified by a factor of 200 or 2000, for example, by one or more amplifier circuits 180, with the amplification factor controlled from the surface by the operator by means of a gain control circuit 182. The amplified analog data signals are then converted to frequency modulated output signals by the FM modulator 184. The output signals from the modulator 184 carry information of the amplitude of the electronic data signals from the crystal sensor 162 in the modulations of the output signal frequencies which, then, represent also the amplitudes of the acoustic disturbances incident on the crystal sensor 162. The frequency modulated output signals from the modulator 184 may be transmitted to the surface electronics 30 by means of an extensive wireline 24, for example, with little or no significant attenuation of the information contained in the output signal due to passage along the wireline. Thus, the FM output signals may reach the surface electronics 30 with a significant signal to noise ratio though carried over a long wireline 24.

The output signals from both circuit branches 166 and 168 are received by a selector circuit 186 which passes one or the other of the output signals to a line driver 188, depending upon the configuration of the selector circuitry. This configuration is selected at the surface by the operator by means of an appropriate electronic informational signal sent down the wireline 24 and decoded at a decode circuit 190 before being passed to the selector 186. Thus, the surface operator may choose which of the two circuit branches 166 or 168 to receive output signals from for further processing by means of surface electronics 30, for example. The line driver 188 boosts the selected output signal for transmission along the wireline 24 by providing sufficient current for the transmission of the signal. A downhole power supply 192 is included within the sonde 12, and may be specifically included within the signal processing section 16 of the acoustic disturbance tool 10 to provide the necessary power levels to the various circuits included within the processing circuitry 160, though specific power connections to the circuit elements are not expressly shown in FIG. 3. The power supply 192 is controllable from the surface by appropriate instructional signals to provide power to appropriate circuit elements as required.

The analog frequency modulated output signal provided by the second circuit branch 168 may be processed and analyzed at the surface generally in the manner described hereinbefore for the output signals provided by prior art noise tools. That is, the spectrum of electronic signals corresponding to various ranges of audio frequency signals may be broken down accordingly and each frequency range analyzed separately to note, for example, the correspondence between depth of the noise tool 10 and peaks in the amplitudes of the signals in various frequency ranges. Other analytical approaches may be taken, as known in the art.

The digital pulse output signal provided by the first circuit branch 166 corresponds to high frequency acoustic signals generated within the well. These high frequency audio signals may extend considerably into the ultrasonic range, and are often associated with rapidly moving fluid, usually gaseous, passing through a relatively small orifice, or about a relatively small obstacle causing turbulent flow. thus, the noise tool 10 may be operated with the selector circuitry 186 in the configuration to transmit digital pulse signals from the first circuit branch 166 to locate leaks or other anomalous fluid flows within the well, if any. For example, in addition to movement of fluid through perforations or leaks in casing or fissures in formation-well bore interfaces, the nose tool operating to isolate the high frequency sounds by the first circuit branch 166 may also detect the high frequency sounds of liquid or gas flowing behind a casing between separate formations. Further, since the first circuit branch 166 isolates and processes high frequency audio signals, and especially ultrasonic frequencies, a well may be logged with the noise tool 10 in the high frequency configuration of the first circuit branch 166 with the sonde 12 in motion, thus saving considerable time and, therefore, expense which might otherwise be lost if the well could only be noise logged with the sonde 12 stationary as in the prior art. Finally, since the frequency modulated output signals from each of the circuit branches 166 and 168 are relatively unaffected by transmission along a long wireline 24, at least as to the quality of and quantity of information carried thereby, a noise tool according to the present invention may be readily used to log very deep wells utilizing extensive wirelines, and with the tool in motion along the well, with the signals being relatively unaffected by high frequency static which might be produced by movement of the wireline along the well at a rapid rate.

It will be appreciated that the two circuit branches 166 and 168 may be included in a single noise tool as illustrated and described herein. The operator can then select, by means of the selector circuit 186, which of the two circuits is to be used for a particular logging run. A selector circuit 186 may be positioned at any stages of the two circuit branches 166 and 168 so that only the branch chosen will process signals beyond the location of the selector cicuit. Further, each of the two circuits may be used in different parts of the same logging run. However, either of the circuit branches 166 and 168 may be utilized alone in a noise tool with the advantages of the corresponding circuit as described hereinbefore. Finally, each of the circuit branches 166 and 168, or both of them, may be utilized with audio sensors of forms other than that described herein and illustrated in FIGS. 2A, 2B, 4 and 5. Further, the specific crystal sensor structure illustrated and described herein may also be utilized with other signal processing circuitry known in the art, for example.

A noise tool according to the present invention may be used to log a well in conjunction with other logging tools. In particular, it may be useful to use a noise tool according to the present invention to isolate and analyze high frequency downhole sounds in conjunction with a temperature logging tool, for example. A change in temperature may be noted to determine whether a leak is into or out of a wellbore. If the noise tool detects a gaseous leak into a wellbore by the high frequency sounds generated by the fluid flow through an orifice, the temperature at the leak may be expected to drop due to cooling produced by the gas expanding. A gas or liquid leak out of the borehole through an opening and into the surrounding area may be accompanied by a rise in temperature due to friction between the fluid and the underground formation material. A noise tool of the present invention may also be used to determine the volume of fluid flowing at a point in a well, particularly in the high frequency signal processing mode (circuit branch 166), since larger volume fluid flow generates greater high frequency noise.

A well logging operation may be conducted according to the present invention by first moving the noise tool along the well while processing the electrical signals generated by the sensor 162 with the dc pulse circuit branch 166. With such a logging run, high frequency sounds are isolated and readily detected to identify depths in the well where leaks or other anomalous fluid movements are located. Then, the tool may be positioned and held at the well depths of interest for further analysis of fluid-produced sounds, using the second circuit branch 168 to produce analog frequency modulated signals.

It will be appreciated that the present invention may be used to determine whether casing perforations, or the surrounding formations, are blocked or allowing fluid to flow freely, as well as to locate leaks into and out of boreholes, and fluid flow behind casing.

The foregoing disclosure and description of the invention is illustrative and explanatory thereof, and various changes in the method steps as well as in the details of the illustrated apparatus may be made within the scope of the appended claims without departing from the spirit of the invention.

I claim:

1. Apparatus for detecting acoustic disturbances comprising:
   a. piezoelectric means for sensing acoustic disturbances and generating electrical signals in response thereto, comprising a plurality of piezoelectric crystals, each crystal having a first contact surface and a second contact surface;
   b. electrical signal processing means for receiving said signals from said piezoelectric means; and
   c. electrical connection means for communicating said electrical signals from said piezoelectric means to said signal processing means, comprising first electrical conductor means generally circumscribing said plurality of piezoelectric crystals, and being in electrical contact with said first surface of each crystal, and second electrical conductor means comprising at least one electrical contact for each crystal, each said contact being biased against said corresponding second surface of the corresponding crystal and being in electrical contact with an elongate electrically conducting pole as part of said second conductor means;
   d. wherein said signal processing means includes filter means for blocking electronic signals from said piezoelectric means below a cutoff frequency while passing signals of higher frequencies, amplifier means for amplifying said higher frequency signals to a usable level, first converter means for changing said high frequency signals to dc voltage levels representative of the amplitudes of said signals from said piezoelectric means, and second converter means for converting said dc voltage levels to dc pulse signals whose pulse rates are representative of said dc voltage levels from said first converter means and of the respective amplitudes of the high frequency signals from said piezoelectric means.

2. Apparatus as defined in claim 1 wherein said first conductor means comprises a generally helical conductor circumscribing said plurality of crystals and in contact with said first contact surfaces thereof.

3. Apparatus as defined in claim 1 wherein:
   a. said crystals are generally tubular in shape, with said first contact surfaces comprising radially outward surfaces of said crystals and said second contact surfaces comprising radially inward surfaces of said crystals, said crystals being arrayed along and circumscribing said pole; and
   b. two of said contacts of said second conductor means are positioned between said pole and each of said crystals with said contacts for each crystal being positioned transversely relative to said pole and on opposite sides thereof, and being biased radially outwardly against said second surface of said respective crystal.

4. Apparatus as defined in claim 3 wherein said first conductor means comprises a generally helical conductor circumscribing said plurality of crystals and in contact with said first contact surfaces thereof.

5. Apparatus as defined in claim 3 comprising generally cylindrical diaphragm means circumscribing said crystals whereby said diaphragm means at least in part isolates said crystals from the exterior environment but may transmit acoustic disturbances from said environment to the interior of said diaphragm means.

6. Apparatus as defined in claim 1 comprising generally cylindrical diaphragm means circumscribing said piezoelectric means whereby said diaphragm means at least in part isolates said piezoelectric means from the exterior environment but may transmit acoustic disturbances from said environment to the interior of said diaphragm means.

7. Apparatus as defined in claim 1 further comprising driver means for providing power for transmission of said output signals from said converter means.

8. Apparatus as defined in claim 1 further comprising second electrical signal processing means for receiving said electrical signals from said piezoelectric means, comprising:
   a. amplifier means for amplifying said electrical signals from said piezoelectric means; and
   b. modulator means for converting said electrical signals from said piezoelectric means after amplification into analog frequency modulated signals.

9. Apparatus as defined in claim 8 further comprising selector means for selecting the output of either said first electrical signal processing means or said second electrical signal processing means for further processing.

10. Apparatus for detecting acoustic disturbances comprising:
   a. sensor means for generating electrical signals in response to acoustic disturbances; and
   b. processing means for processing said electrical signals comprising:
      i. first circuit means for providing first output electrical signals in the form of dc pulses wherein the pulse rates are representative of the amplitudes of said electrical signals from said sensor means;
      ii. second circuit means for providing second output electrical signals in the form of analog frequency modulated signals whose frequencies are representative of the amplitudes of said electrical signals from said sensor means; and
      iii. selector means selectively operable whereby said output signals from either said first circuit means or from said second circuit means may be provided for further processing.

11. Apparatus as defined in claim 10 wherein said selector means receives both said first and second output signals and is operable to select either said first output signal or said second output signal for further processing.

12. Apparatus as defined in claim 10 further comprising driver means for providing power for transmission of the selected output signal from said electrical processing means for transmission.

13. Apparatus as defined in claim 10 wherein said first circuit means comprises:
   a. filter means for blocking electronic signals from said sensor means below a cutoff frequency while passing signals of higher frequencies; and
   b. converter means for converting said high frequency signals to dc pulse output signals whose frequencies are representative of the respective amplitudes of the high frequency signals from said sensor means.

14. Apparatus as defined in claim 13 wherein said converter means comprises:
   a. first converter means for changing said high frequency electrical signals from said sensor means to dc voltage levels representative of the amplitudes of said electrical signals from said sensor means; and
   b. second converter means for converting said dc voltage level signals to dc pulse signals whose pulse rates are representative of said voltage levels from said first converter means.

15. Apparatus as defined in claim 14 further comprising amplifier means, as part of said first circuit means, for amplifying said high frequency signals before they are communicated to said converter means.

16. Apparatus as defined in claim 15 wherein:
   a. said amplifier means includes variable gain; and
   b. said first circuit means further comprises gain control means, selectively operable for determining the gain of said amplifier means.

17. Apparatus as defined in claim 13 further comprising amplifier means, as part of said first circuit means, for amplifying said high frequency signals before they are communicated to said converter means.

18. Apparatus as defined in claim 10 wherein said second circuit means comprises:
   a. amplifier means for amplifying said electrical signals from said sensor means; and
   b. modulator means for converting said electrical signals from said sensor means after amplification into analog frequency modulated signals.

19. Apparatus as defined in claim 18 wherein:
   a. said amplifier means includes variable gain; and
   b. said second circuit means further comprises gain control means, selectively operable for determining the gain of said amplifier means.

20. Apparatus for detecting acoustic disturbances comprising:
   a. sensor means for generating electrical signals in response to acoustic disturbances;
   b. first processing circuit means for providing output electrical signals in the form of dc pulses wherein the pulse rates are representative of the amplitudes of said electrical signals from said sensor means including filter means for blocking electronic signals from said sensor means below a cutoff frequency while passing signals of higher frequencies, first converter means for changing said high frequency electrical signals from said sensor means to dc voltage levels representative of the amplitudes of said electrical signals from said sensor means, and second converter means for converting said dc voltage level signals to dc pulse signals whose pulse rates are representative of said voltage levels from said first converter means; and
   c. second processing circuit means for providing output electrical signals in the form of analog frequency modulated signals whose frequencies are representative of the amplitudes of said electrical signals from said sensor means including amplifier means for amplifying said electrical signals from said sensor means and modulator means for converting said electrical signals from said sensor means after amplification into analog frequency modulated signals.

21. Apparatus as defined in claim 20 further comprising amplifier means, as part of said first processing circuit means, for amplifying said high frequency signals before they are communicated to said first converter means.

22. Apparatus as defined in claim 21 wherein:
   a. said amplifier means includes variable gain; and
   b. said first processing circuit means further comprises gain control means, selectively operable for determining the gain of said amplifier means.

23. Apparatus as defined in claim 20 further comprising driver means for providing power for transmission of said output signals from said processing circuit means.

24. Apparatus as defined in claim 20 wherein:
   a. said amplifier means includes variable gain; and
   b. said second processing circuit means further comprises gain control means, selectively operable for determining the gain of said amplifier means.

25. Apparatus as defined in claim 20 further comprising driver means for providing power for transmission of said output signals from said processing circuit means.

26. Apparatus for detecting acoustic disturbances comprising:
   a. a plurality of piezoelectric crystals with each crystal generally tubular in shape, the radially internal surfaces of said crystals providing first electrical contact surfaces, and the radially external sufaces of said crystals providing second electrical contact surfaces;
b. core means generally circumscribed by said crystals with said crystals arrayed longitudinally along said core means;
c. said core means comprising first electrical conductor means, including an elongate, electrically conducting pole and a plurality of electrical contacts, with at least one contact electrically communicating between said pole and said first contact surface of each of said crystals, and further wherein said contacts are biased radially outwardly toward said first contact surfaces; and
d. second electrical conductor means comprising an electrical conductor formed generally in the shape of a helix circumscribing said piezoelectric crystals and in electrical contact with said second contact surfaces of said crystals.

27. Apparatus as defined in claim 26 further comprising:
a. spacer means for isolating said piezolelectric crystals from mutual contact; and
b. spring means operable for maintaining said piezoelectric crystals and said spacer means biased together.

28. Apparatus as defined in claim 26 wherein said contacts of said first conductor means are provided in pairs, with the two contacts in each pair positioned to be biased radially outwardly in opposite senses along the same direction and against the first contact surface of the same piezoelectric crystal.

29. Well logging apparatus comprising:
a. sensor means for detecting acoustic disturbances and providing electrical signals responsive thereto;
b. processing means for processing said electrical signals within a well, including electrical circuit means for processing said electrical signals to provide output signals for transmission to the surface wherein said output signals may be provided as dc pulse signals whose pulse rates carry information of the amplitudes of said electrical signals provided by said sensor means, and may be provided in the form of analog frequency modulated carrier signals whose frequency modulations carry information of the amplitudes of said electrical signals provided by said sensor means; and
c. selector means operable for selecting output signals for transmission to the surface either as such pulse signals or as such analog frequency modulated carrier signals.

30. Well logging apparatus comprising:
a. sensor means for detecting acoustic disturbances and providing electrical signals responsive thereto;
b. processing means for processing said electrical signals within a well, including electrical circuit means for processing said electrical signals to provide output signals for transmission to the surface wherein said output signals are in the form of digital pulse signals whose pulse rates provide information corresponding to the amplitudes of the electrical signals provided by said sensor means and analog frequency modulated carrier signals whose frequency modulations carry information of the amplitudes of said electric signals provided by said sensor means.

31. A method of logging a well comprising the following steps:
a. providing a logging tool including a detector for sensing acoustic disturbances and producing electrical signals in response thereto;
b. positioning said tool within a well to be logged;
c. processing such electrical signals produced by said detector means in response to acoustic disturbances in said well by converting such signals into digital pulse signals whose pulse rates are representative of the amplitudes of the electrical signals so produced by said detector means; and
d. processing such electrical signals produced by said detector means in response to acoustic disturbances in said well by converting such signals to analog signals whose frequency modulations carry information of the amplitudes of said electrical signals so produced by said detector means.

32. A method as defined in claim 31 wherein such electrical signals are so produced by said detector means as said logging tool is being moved along said well.

33. A method as defined in claim 31 wherein the process of converting the electrical signals from said detector means to digital pulse signals further comprises the following steps:
a. converting the ac electrical signals from said detector means into dc voltage levels wherein the values of the dc voltage levels are representative of the amplitudes of the corresponding ac electrical signals from said detector means; and
b. converting said dc voltage levels into digital pulses whose pulse rates are representative of the values of said voltage levels.

34. A method as defined in claim 33 further comprising the step of selecting only electrical signals from said detector means of frequencies above a cutoff frequency for such processing.

35. Apparatus for detecting acoustic disturbances comprising:
a. piezoelectric means for sensing acoustic disturbances and generating electrical signals in response thereto;
b. first electrical signal processing means for receiving said signals from said piezoelectric means including filter means for blocking electronic signals from said piezoelectric means below a cutoff frequency while passing signals of higher frequencies, first converter means for changing said high frequency signals to dc voltage levels representative of the amplitudes of said signals from said piezoelectirc means, and second converter means for converting said dc voltage levels to dc pulse signals whose pulse rates are representative of said dc voltage levels from said first converter means and of the respective amplitudes of the high frequency signals from said piezoelectric means;
c. second electrical signal processing means for receiving said electrical signals from said piezoelectric means, including amplifier means for amplifying said electrical signals from said piezoelectric means, and modulator means for converting said electrial signals from said piezoelectric means after amplification into analog frequency modulated signals;
d. electrical connection means for communicating said electrical signals from said piezoelectric means to both said signal processing means; and
e. selector means for selecting the output of either said first electrical signal processing means or said second electrical signal processing means for further processing.

* * * * *